(12) United States Patent
Seo

(10) Patent No.: US 6,798,980 B1
(45) Date of Patent: Sep. 28, 2004

(54) APPARATUS AND METHOD OF CONVERTING AUDIO/VIDEO DATA STORAGE FORMAT IN DIGITAL TELEVISION RECEIVER

(75) Inventor: Beom Joo Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 796 days.

(21) Appl. No.: 09/610,883

(22) Filed: Jul. 6, 2000

(30) Foreign Application Priority Data

Jul. 6, 1999 (KR) ........................................ 1999/27084

(51) Int. Cl.$^7$ ............................ H04N 5/85; H04N 7/01; H04N 7/04
(52) U.S. Cl. ....................... 386/125; 386/124; 386/131; 386/105
(58) Field of Search ............................ 386/83, 46, 124, 386/125, 126, 45, 106, 105, 92, 1, 40, 52, 4, 66, 55, 95, 96, 98, 131; 348/555, 556; H04N 5/85, 7/01, 7/04

(56) References Cited

U.S. PATENT DOCUMENTS

| 5,907,329 A | * | 5/1999 | Nobutani et al. | ............ 345/537 |
| 6,504,996 B1 | * | 1/2003 | Na et al. | .................... 386/125 |
| 2002/0159762 A1 | * | 10/2002 | Ando et al. | .................. 386/95 |

* cited by examiner

Primary Examiner—Robert Chevalier
(74) Attorney, Agent, or Firm—Birch, Stewart, Kolasch & Birch, LLP

(57) ABSTRACT

An apparatus and method of converting audio/video data storage format in a digital television receiver is disclosed. The present invention effectively compresses and stores broadcasting data to secure more storage space of a hard disk, thereby allowing a storage of a larger amount of the broadcasting data. Particularly, a format or a picture quality of a broadcasting data may be converted to secure more storage space.

20 Claims, 3 Drawing Sheets

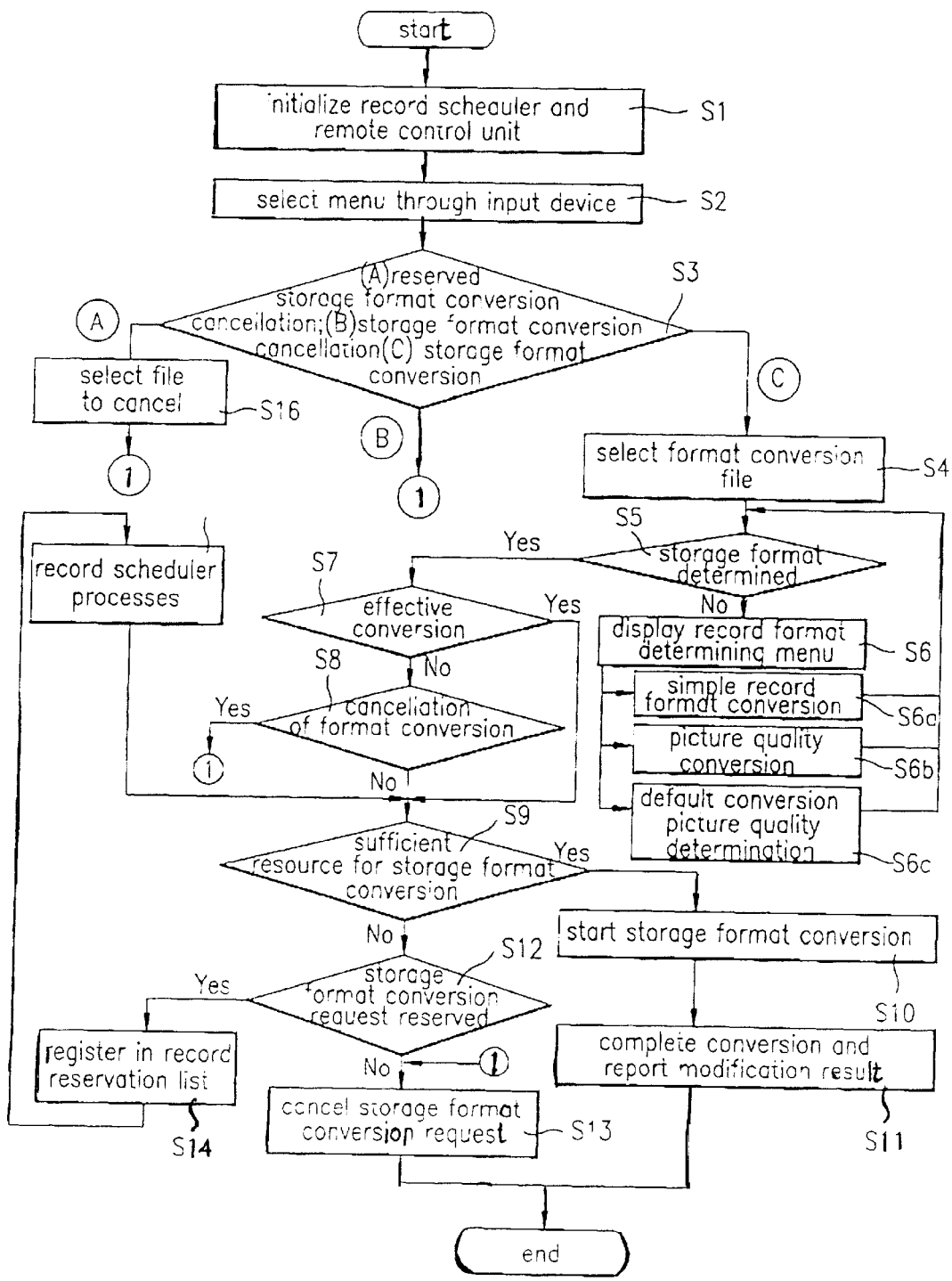

APPARATUS AND METHOD OF CONVERTING AUDIO/VIDEO DATA STORAGE FORMAT IN DIGITAL TELEVISION RECEIVER

BACKGROUND OF THE INVENTION

1. Field of the Invention

The present invention relates to a digital television receiver, and more particularly to an apparatus and method of converting a storage format of audio/video data recorded in a hard disk drive of a digital television receiver or a set-top box.

2. Background of the Related Art

Recently, techniques and applications for recording digital broadcasting data on a hard disk drive that can be installed in a digital television (TV) receiver or a set-top box (STB) have been widely popularized and commercialized.

In current recording methods, a method in the related art encodes the existing National Television System Committee/Phase Alternation by Line (NTSC/PAL) type analog broadcasting data into a Moving Picture Experts Group (MPEG) stream and records the MPEG stream. A second method records the digital broadcasting data directly in a memory device. Namely, this method directly records the MPEG-2 transport stream (TS) having a maximum reproduction rate of 19.5 Mbps using a TS application which is a new digital TV application service different from a general digital video home system (D-VHS) appliance.

The second method has advantages because the TS application allows reproduction of the recorded broadcasting data without deterioration of a picture quality at any time and/or position selected by a user. However, the broadcasting data recording method in the related art using the TS application as described above has the following problems.

First, unlike a general video cassette recorder (VCR) tape, the data information recorded in the hard disk using the TS application is difficult to modify or manage. Second, since a volume of a program such as an MPEG-2 TS of a 19.5 Mbps grade requires a storage space of 14.4 GB for a standard of 100 minutes, recording of several volumes of programs in the hard disk using the TS application causes a problem due to the limited capacity of the hard disk.

SUMMARY OF THE INVENTION

Accordingly, an object of the present invention is to solve at least the problems and disadvantages of the related art.

An object of the present invention is to provide a more efficient apparatus and method of converting the AV data storage format in a digital TV.

Another object of the present invention is to provide an apparatus and method which secures more storage space for recording data in a hard disk of a digital TV receiver.

A further object of the present invention is to provide an apparatus and method of converting the AV data storage format in a digital TV receiver which effectively compresses and records broadcasting data in a hard disk of the digital TV receiver.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an apparatus for converting an AV data storage format in a digital TV receiver comprises a first memory unit for temporarily storing an AV data transmitted from an external source; a second memory unit for storing the data temporarily stored in the first memory unit; a format converting unit for restoring the data stored in the first memory and the second memory, converting a format of the restored data in accordance with a storage format specified in a record reservation list, and compressing the format-converted data; and a record scheduler processing unit for controlling the format converting unit in accordance with a user request and pre-stored format converting information.

According to the present invention, the format converting unit converts data of a transport stream format received from an external source into a data of program stream (PS) format, and compresses the PS format data. Also, the format converting unit compresses the AV data stored in the first and second memory unit in a manner that a user can select a level of picture quality through a preview function while viewing a picture corresponding to the stored data, thereby allowing the user to view the picture at the selected level of picture quality.

In a method of converting an AV data storage format in a digital TV receiver in accordance to the present invention comprises searching whether a format conversion file is selected and searching a file list pre-stored in a record reservation list if a format conversion is requested; determining a new storage format by converting the format conversion file into a PS format data and lowering a picture quality of the PS format data by a preview function, if the format conversion file has not been selected or if a new format conversion file is selected by an external event; selecting one of either a pre-stored storage format or the determined storage format and checking whether a system resource required for converting the corresponding data into the format conversion file is sufficient; converting the corresponding data in accordance with the determined storage format if the system resource for converting the corresponding data is sufficient; inquiring to a user whether to make reservation if the system resource for converting the corresponding data is not sufficient; and storing in the record reservation list a reservation time and the storage format of the format conversion if the user accepts the reservation, and canceling the format conversion request if the user refuses the reservation.

According to the present invention, the space of a hard disk can be used more efficiently by converting data in a transport stream format into the program stream format and by lowering the picture quality of the data. Therefore, a large amount of broadcasting data can be recorded in a limited storage space of the hard disk.

BRIEF DESCRIPTION OF THE DRAWINGS

The invention will be described in detail with reference to the following drawings in which like reference numerals refer to like elements wherein:

FIG. 3 is a flowchart of converting a storage format according to the present invention.

DETAILED DESCRIPTION OF THE PREFERRED EMBODIMENT

Reference will now be made in detail to the preferred embodiment of the present invention, examples of which are illustrated in the accompanying drawings.

Figure 1:
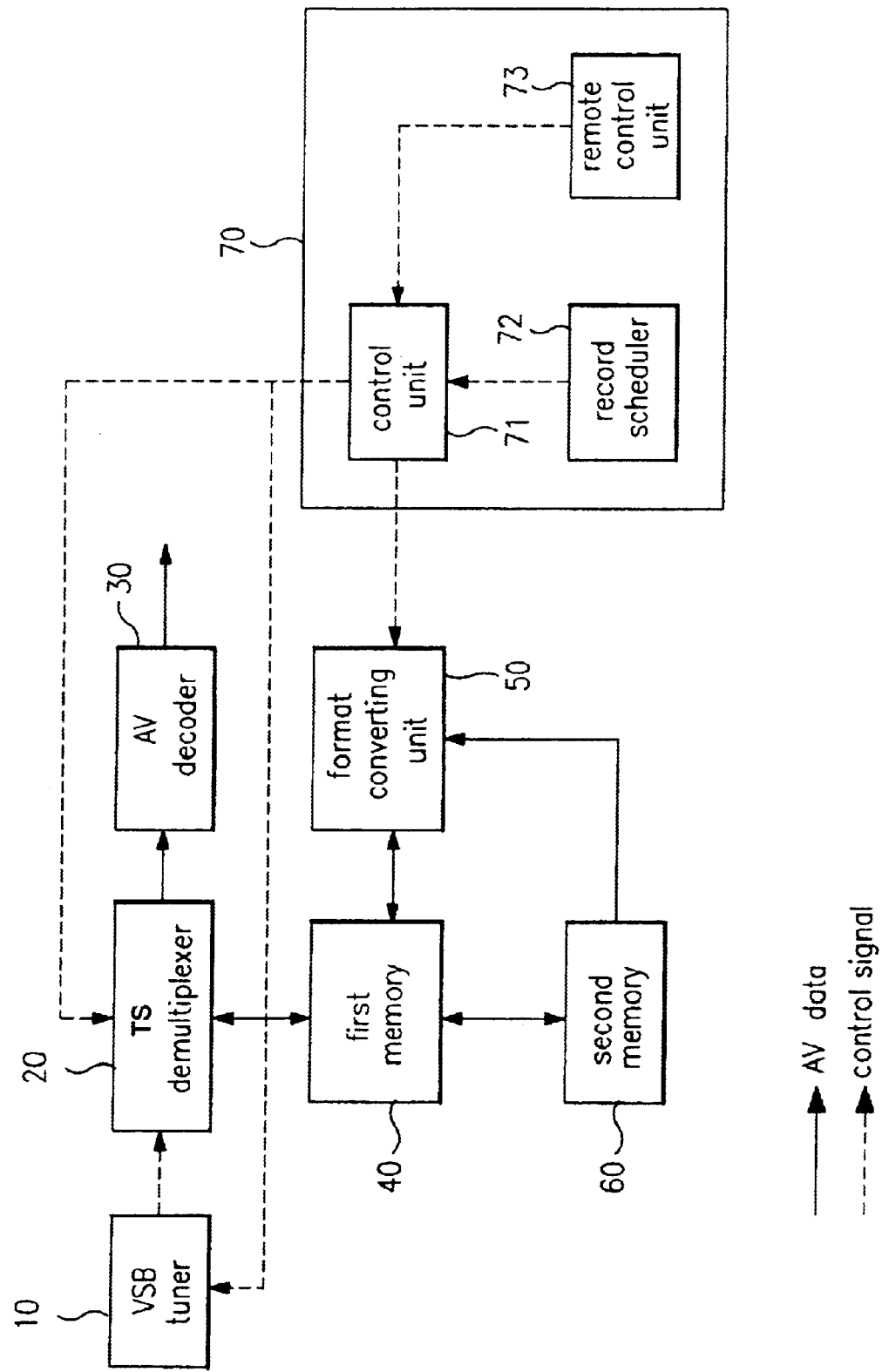
FIG. 1 is a block diagram of the AV data storage format converting apparatus in a digital TV receiver in accordance with to the present invention.

FIG. 1 is a block diagram of an apparatus for converting AV data storage format in a digital TV according to the present invention. The present apparatus includes a VSB tuner which receives transmissions of a plurality of broadcasting network programs in a transport stream format; a TS demultiplexer 20 which selects one of the plurality of broadcasting network reproduction programs received through the VSB tuner 10 according to a request from a user; and an AV decoder 30 which decodes the selected broadcasting network program into an AV data format and outputs the AV data.

The present apparatus for converting AV data storage format also includes a first memory 40 which temporarily stores the selected broadcasting network program in the TS format; a second memory 60 which again stores through a direct memory access (DMA) the TS stream stored in the first memory 40; a format converting unit 50 which restores the data stored in the first memory 40 and the second memory 60, converts the format of the restored data according to a storage format, and compresses the converted data; and a record scheduler processing unit 70 which controls the TS multiplexer 20 and the format converting unit 50.

Here, the record scheduler processing unit 70 includes a record scheduler 72 which stores a record reservation list; a remote control unit 73 which issues a request related to a file format conversion; and a control unit 71 which controls the record scheduler and the format converting unit 50. Also, in the preferred embodiment, the first memory 40 is a random access memory (RAM) and is an internal storage device, while the second memory 60 is a hard disk and is an external storage device.

Figure 2:
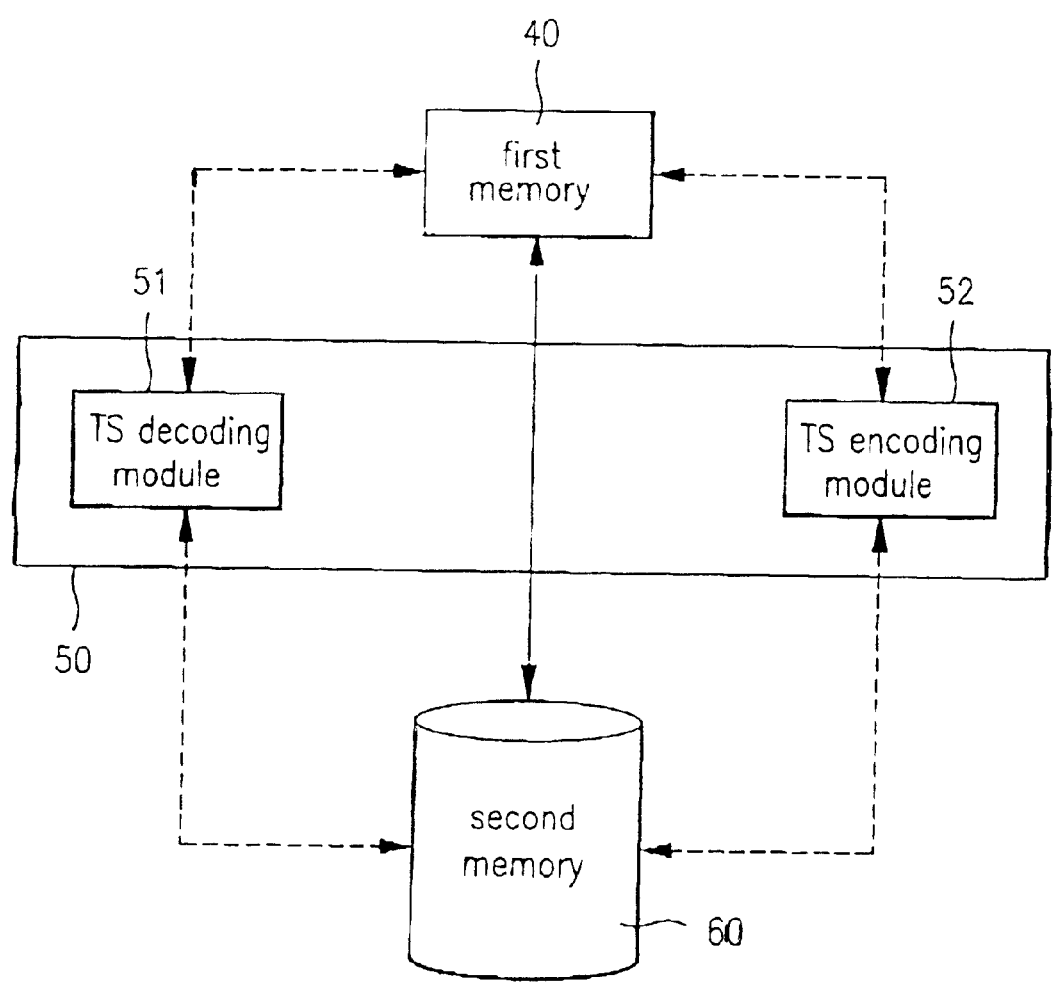
FIG. 2 shows a conversion of a file format according to the present invention.

FIG. 2 shows the first and second memory with the format converting unit 50 which converts a file format according to the present invention. The format converting unit 50 includes a TS decoding module and a TS encoding module, and performs a software format conversion using a utility that converts a MPEG-2 format file into either a MPEG-1 format file or another format.

Referring to FIG. 2, the TS decoding module 51 reads out the data stored in the second memory 60 in units of 188 bytes, and temporarily stores the read data in the first memory 40. The TS decoding module 51 then decodes the data stored in the first memory 40 and stores the decoded data as an intermediate data in either the first memory 40 or the second memory 60. Here, the intermediate data may be stored in the first memory 40 until the storage capacity of the first memory 40 reaches a predetermined level. At that point, the intermediate data would be stored in the second memory 60. This operation of decoding the data from the second memory 60 is repeated until the decoding of the data is completed.

The TS encoding module 52 searches whether an intermediate data is stored in either the first memory 40 or the second memory 60. If an intermediate data is stored in the second memory 60, the TS encoding module 52 stores the intermediate data back in the first memory 40. Thereafter, the TS encoding module 52 encodes the intermediate data stored in the first memory 40 and stores the encoded data in the second memory 60. Namely, the TS encoding module 52 encodes the intermediate data into a format according to a storage format such as the MPEG-1 format file. This operation of encoding the intermediate data is repeated until the encoding of the intermediate data is completed.

The operation of the apparatus and method of converting the AV data storage format in a digital TV according to the present invention will next be explained in detail with reference to the accompanying drawings. Namely, FIG. 3 shows a process of converting the storage format according to the present invention.

Referring to FIG. 3, if the power of a digital TV is tuned on, the record scheduler 72 and the remote control unit 73 in the record scheduler processing unit 70 are initialized (step S1).

The record scheduler processing unit 70 is a system demon processor which continuously functions in the first memory 40. Accordingly, the record scheduler processing unit 70 activates simultaneously as the power of the digital TV is turned on. Namely, the record scheduler processing unit 70 stores data in a format according to a format conversion request by a user, at a reserved time. Thus, the record scheduler processing unit 70 is periodically activated by a timer to process a storage format converting request registered in the record reservation list of the recorder scheduler 72. Upon completion of the request, the record scheduler processing unit 70 enters a stand-by mode until a certain event is generated.

Particularly, the record reservation list includes a field with a name of a program whose storage format is to be converted, e.g. the program name with a format which has not been down-converted such as MPEG-2 TS, the shape of the reproduced picture, a reproduction rate, a file format such as MPEG-1 PS to which the original program is to be converted according to the request of the user, a reservation time, and a number of format conversion failures.

While the record scheduler processing unit 70 is periodically activated by a timer, the remote control unit 73 checks for a user input requesting a selection related to a format conversion. A user can make an input from a menu displayed on a screen of the digital TV through an input device, such as a remote control. Thereafter, the remote control unit 73 executes a request related to a format conversion. Depending upon the user input received by the remote control unit 73, one of a request for "storage format conversion," "cancellation of reserved storage format conversion," or "cancellation of storage format conversion" is executed (step S2). Here, a selection may be made directly through a pre-assigned input button attached to a remote control pad or through a menu on an electronic program guide (EPG) program of the digital TV.

If a "cancellation of reserved storage format conversion" is requested, a user may view the record reservation list stored in the record scheduler 72 and select a program reserved for storage format conversion (step S16). Accordingly, a storage format conversion of a corresponding program selected by the user would be cancelled (step S13), all resource pre-allocated for the storage format conversion is returned to the system (step S13), and the process is terminated.

If a "cancellation of storage format conversion" is requested, a storage format conversion of a program currently being format converted is cancelled (step S13), resources related to the storage format conversion currently being used is returned, and the operation is completed.

If a "storage format conversion" is requested, the record reservation list stored in the record scheduler 72 may be viewed and a program to be converted may be selected by a user through a menu screen (step S4). If either a format conversion of a new program is selected or a new storage format of a program existing in the reservation list is designated by a user input, a storage format determining menu is displayed (step S6). The storage format determining menu may include selections corresponding to a "simple storage format conversion," a "picture quality change," and "default change picture quality selection" and the file storage format is designated by a selection through the menu. The operation according to the selection from the storage format determining menu is as follows.

A selection of the "simple storage format conversion" (step S6a) converts the currently stored TS format file into a PS format file with a same picture quality. By converting the TS format file into the PS format file, a plurality of header data except for the compressed data according to the broadcasting network reproduction are reduced to one header data. Thus the recorded broadcasting data can be compressed without deterioration of the picture quality.

A selection of the "picture quality change" (step S6b) adjusts the picture quality according to an input by a user through the remote control unit 52 as the user views the reproduced picture. After a user lowers the picture quality to a level which would not inconvenience the user in viewing the picture, the picture quality may be changed to the determined level in response to an input from the user such as pressing a pre-assigned button. Namely, the user may try adjusting the picture quality while viewing the picture in converted formats through a preview function, before the user selects a picture quality. Here, the user may also adjust the size of the reproduced picture while viewing the preview.

If a hard disk is used as the storage device of the digital TV, the problems which occurs due to a limited storage capacity of the hard disk when several programs are recorded can be solved. In practice, digital data transmitted through the digital broadcasting network is a MPEG-2 transport stream of 19.5 Mbps. Thus, a hard disk having the capacity of 14.4 GB (using standard of 100 minutes) is required for recording one digital data program. As a result, because a high-capacity hard disk is required for recording several programs, the technology in the related art only allows for recording one or two programs in a hard disk.

Therefore, the present invention effectively increases the capacity of the hard disk installed in a digital TV receiver by compressing recorded programs such as a news program which can be viewed with a lower picture quality without inconvenience to the user. For example, if the picture quality of a MPEG-2 TS of 19.5 Mbps is lowered to a level of a general video compact disk (CD), the required hard disk capacity can be reduced by thirteen times.

Referring back to FIG. 3, a selection of the "default picture quality selection" (step S6c) sets a default storage format, shape of reproduced picture, and picture quality information without further input from the user. Namely, a post-processed picture according to the default setting is displayed on the screen. After a program to be converted is stored, the record scheduler 72 prepares the program file to be converted for about one minute, and continuously displays the picture until the user terminates the selection of the record format determining menu.

After the storage format is determined by a user as described above, a determination is made whether conversion of the selected program in the storage format set by the user would result in an effective use of the storage capacity (step S7). If the storage format conversion is determined to be not effective, the user is notified (step S8). If the user cancels the format conversion upon the notification, all resource currently used for the format conversion would be returned, and the process is terminated (step S13).

If either there is an effective use of the storage capacity by the storage format conversion or the user requests the storage format conversion regardless of the effect on the storage capacity, the system resource such as the buffer space and hard disk space required for converting the storage format is checked (step S9). Here, a determination must also be made whether the user is currently viewing the TV because the conversion is software processed which can significantly increases the software load on a digital TV.

If the system resource is determined to be insufficient, the user is notified that the storage format conversion cannot be performed at the present time, and an inquiry whether to reserve the format conversion is made to the user (step S12). If the user refuses the format conversion reservation, the storage format conversion request is cancelled (step S13), all resource currently used is returned (step S13), and the process is terminated. If the user requests a reservation of the storage format conversion, the information according to the reservation request is stored in the record reservation list in the record scheduler 72 (step S14). When a reservation request is stored in the record reservation list, at the reserved time, the process returns to step S9 through a record scheduler process (step S15) to determine whether the system resource is sufficient for converting the storage format.

If the system resource is sufficient for converting the storage format in step S9, the storage format conversion is performed, and the recording status is displayed on the screen (step S10). When the recording is completed, the new disk space and the whole disk space are informed to the user in terms of a quantity of recording time left (step S11).

As described above, the AV data storage format converting apparatus and method according to the present invention has the following advantages. First, by converting the storage format of the broadcasting data and/or lowering the picture quality of the broadcasting data before recordation, the storage space of the hard disk can be effectively increased. Thus a large amount of broadcasting data can be recorded without addition of any auxiliary storage device. Second, the present apparatus and method can be applied to any fields where broadcasting data to be stored in a hard disk is compressed and stored in other auxiliary storage devices.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, conversions, and variations will be apparent to those skilled in the art.

What is claimed is:

1. An apparatus for converting an AV data storage format in a digital TV receiver comprising:
    a first memory unit which temporarily stores original data transmitted from an external source;
    a second memory unit which stores the original data from the first memory unit through a direct memory access and stores compressed format-converted data;
    a format converting unit which restores the original data in either the first memory or the second memory, converts a format of the restored data in accordance with a storage format, compresses the format-converted data, and stores the compressed format-converted data in the second memory unit; and
    a record scheduler processing unit which controls the format converting unit in accordance with a user request and a reserved format conversion information.

2. An apparatus of claim 1, wherein the format converting unit converts the original data from a TS format into a PS format and compresses the PS format data.

3. An apparatus of claim 1, wherein the format converting unit lowers a picture quality of the original data and compresses the original data with a lower picture quality.

4. An apparatus of claim 3, wherein the format converting unit lowers the picture quality to a level selected by a user through a preview function.

5. An apparatus of claim 1, wherein the format converting unit comprises:
- a TS decoding module which decodes the original data from either the first memory or the second memory unit; and
- a TS encoding module which encodes data decoded by the TS decoding module into a format in accordance with said storage format and stores the encoded data in the second memory unit as the compressed format-converted data.

6. An apparatus of claim 5, wherein the TS encoding module performs a software format conversion using a utility that converts a MPEG-2 format file into a MPEG-1 format file.

7. An apparatus of claim 1, wherein the record scheduler processing unit comprises:
- a remote control unit which receives a user request for a storage format conversion, said user request received through an input device;
- a record scheduler which stores in a record reservation list the storage format conversion requested by the user request; and
- a control unit which outputs a control signal to the format converting unit in accordance with output signals of the remote control unit and the record scheduler.

8. An apparatus of claim 7, wherein the record reservation list includes at least one of a name of a program whose storage format is to be converted, a shape of a reproduced picture, a reproduction rate, a file format to which the program is to be converted according to the request of the user, a reservation time, and a number of storage format conversion failures.

9. An apparatus of claim 1, wherein the first memory unit is a RAM and the second memory unit is a hard disk.

10. A method of converting an AV data storage format in a digital TV receiver comprising:
- (a) receiving a format conversion file selected by a user from a record reservation list if a format conversion is requested by the user through an external input device;
- (b) determining a storage format of said format conversion file if either said format conversion file is a new file or a new storage format of said format conversion file existing in the reservation list is requested;
- (c) checking whether a system resource required for converting said format conversion file into a format corresponding to said storage format is sufficient; and
- (d) converting said format conversion file into a format corresponding to said storage format if the system resource is determined to be sufficient.

11. A method of claim 10, wherein in (b), said storage format is either one of a format conversion into a PS format or lowering a picture quality.

12. A method of claim 10, wherein in (b), the storage format is either one of lowering a picture quality of said format conversion file to a level selected by the user or adjusting a reproduction size of said format conversion file to a size selected by the user.

13. A method of claim 12, wherein either the level of picture quality or the reproduction size is selected by the user through a preview function.

14. A method of claim 10, further comprising:
- (e) making an inquiry to the user whether to make reservation if the system resource is determined to be insufficient; and
- (f) storing in the record reservation list a reservation time and said storage format of said format conversion file if the user requests a reservation in (e), and otherwise, cancelling the format conversion request.

15. A method of claim 10, further comprising:
- notifying the user before (c), whether a conversion of said format conversion file in accordance with said storage format would be efficient; and
- cancelling the format conversion request if the user requests for a cancellation.

16. A method of claim 10, wherein in (b), determining a storage format according to a user request through a menu which includes selections corresponding to at least a "simple storage format conversion," a "picture quality change," and "default change picture quality selection."

17. A method of claim 10, wherein (d) comprises:
- decoding data from either a first memory or a second memory unit; and
- encoding the decoded data into a format in accordance with said storage format and storing the encoded data in the second memory unit.

18. A method of converting an AV data storage format in a digital TV receiver comprising:
- (a) storing a TS format file in a first memory unit;
- (b) converting the TS format file from the first memory unit into a PS format file and storing the PS format file in a second memory unit.

19. A method of claim 18, wherein in (b), further lowering a picture quality of the PS format file before storing the PS format file in the second memory unit.

20. A method of claim 19, wherein the picture quality of the PS format file is lowered to a level selected by a user through a preview function.

* * * * *